T. TERRY.
Sulky Corn-Planter and Grain-Drill.
No. 196,954.  Patented Nov. 6, 1877.
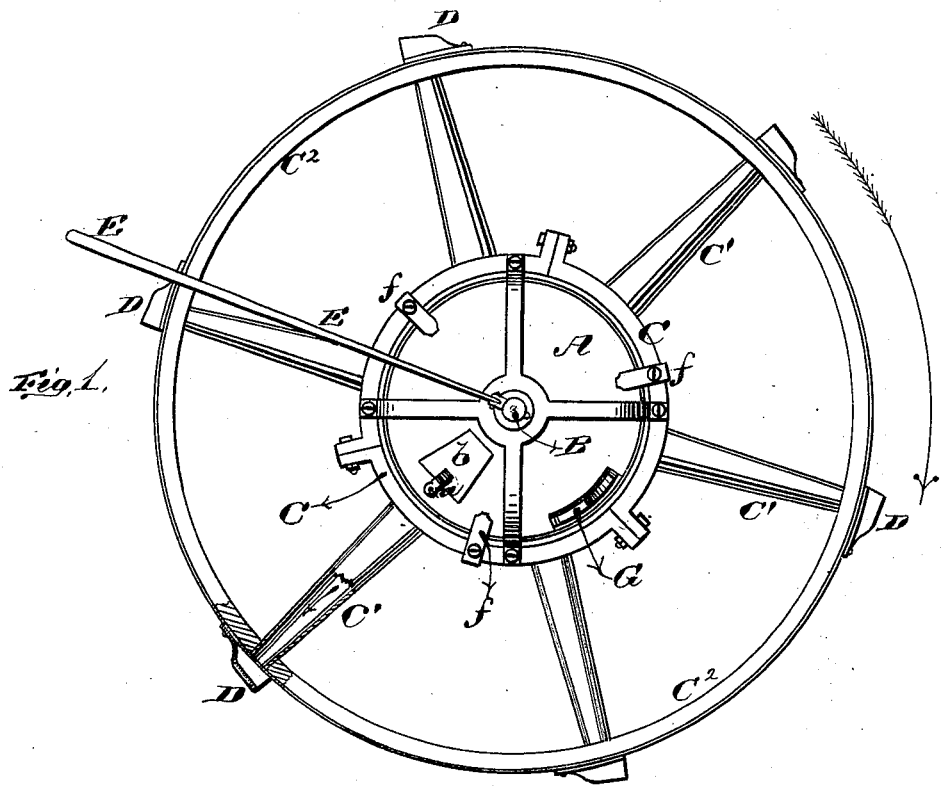
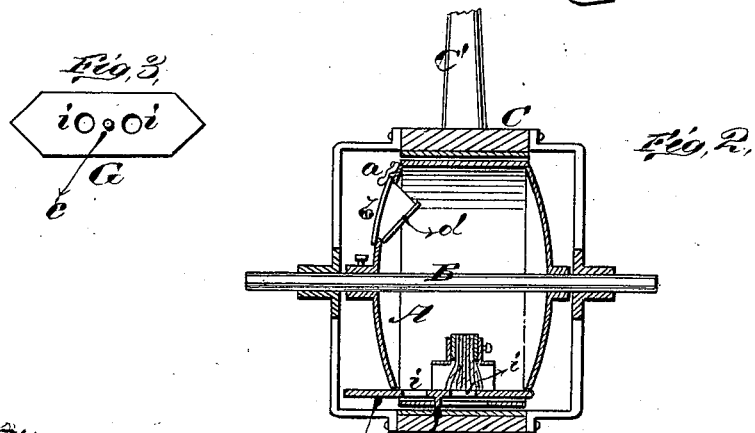

UNITED STATES PATENT OFFICE.

THOMSON TERRY, OF MOUNT OLIVET, KENTUCKY.

IMPROVEMENT IN SULKY CORN-PLANTER AND GRAIN-DRILL.

Specification forming part of Letters Patent No. 196,954, dated November 6, 1877; application filed September 15, 1877.

*To all whom it may concern:*

Be it known that I, THOMSON TERRY, of Mount Olivet, in the county of Robertson and State of Kentucky, have invented a new and valuable Improvement in Sulky Corn-Planter and Grain-Drill; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my sulky corn-planter and grain-drill. Fig. 2 is a horizontal sectional view, and Fig. 3 a detail thereof.

The nature of my invention consists in the construction and arrangement of a sulky corn-planter and grain-drill, as will be hereinafter more fully set forth.

The annexed drawings, to which reference is made, fully illustrate my invention.

In the construction of my machine a pair of shafts is to be attached to the axle, which is to be of iron, said axle passing through the hoppers. The wheels revolve, leaving the axle and hoppers stationary.

In the drawings I have only shown one wheel, as both are precisely alike.

A represents a hollow cylindrical hopper attached to the axle B, and fitting closely in the hub C of the wheel. This hopper contains the grain, which is admitted through a hinged door, $b$, in the side of the hopper. The door $b$ is hinged at its lower edge, and provided with side pieces $d\,d$, so arranged that the door can only open a certain distance. When the door is closed it is locked by a latch, $a$.

$C^1\,C^1$ are the spokes of the wheel connecting the hub C with the rim $C^2$. These spokes are hollow, and in the rim are openings communicating with said hollow spokes for the passage of the grain. Attached to the outside of the rim $C^2$, over each opening, is a concave shoe, D, (or a spring-valve may be used,) for the double purpose of making a place for the grain and preventing the openings from filling with dirt, and thus clogging the grain.

In the bottom of the hopper is a double feed-slide, G, which is held in its place by means of a pin, $e$, projecting from it into a slot in the rim of the hopper.

In the slide G are two holes, $i\,i$, equidistant from its ends, for the reception of the grain, one being under a stationary brush or cut-off in the hopper, and immediately over the openings in the hopper, hub, and spoke, while the other is exposed for the reception of the grain. The ends of the feed-slide are both made V-shaped, and when the wheel revolves these ends come alternately in contact with shuttle-drivers $f\,f$, secured on both sides of the wheel, forcing the slide alternately from side to side, the whole being so adjusted that the cavity containing the grain stops each time directly over the proper openings, allowing the grain to pass out of the hollow spoke and rim into the ground. By making the ends of the slide G in V shape, it allows it to work equally as well in backing the machine as in going forward.

To regulate the amount of grain delivered each time, the delivery-openings $i$ in the slide will be provided with adjustable slides, constructed and arranged in any of the known and usual ways.

Attached to the axle B is a lever E for cutting off the feed. By means of this lever the axle and hopper may be turned partly around, and held fast by a ratchet near the driver's seat, thus allowing the machine to move forward or backward, and the slide to move right and left between the openings in the hub, preventing the escape of grain.

A coverer is to be arranged behind each wheel to cover the grain, and said coverer is to be controlled by a suitable lever.

The hollow spokes $C^1$ of the wheel are placed close enough together, and the feed so regulated as to drill the corn or seed. Then, in order that the same machine may be used as a planter and drill, a cut-off is to be attached to a sufficient number of the spokes in the hub to shut off or prevent the escape of the grain through a portion of the spokes.

Instead of two wheels only to my machine, one or more wheels may be added by means of a jointed axle.

The distance between the wheels may be adjusted by moving each wheel in or out an equal distance on the axle, thus enabling the operator to vary the distance between the rows at pleasure.

A separator may be added to the concave side of the shoe to scatter the grain as it comes out.

What I claim as new, and desire to secure by Letters Patent, is—

1. A planter and drill consisting of a stationary hopper inclosed within the hub of a rotating wheel, having hollow spokes and openings in the rim for the passage of the grain, as herein set forth.

2. The combination of the cylindrical hopper, surrounding hub, hollow spokes, and perforated rim, provided on its exterior, over the openings, with concave shoes, or their equivalents, opposite each hollow spoke, substantially as and for the purposes set forth.

3. The cylindrical hoppers, surrounding hub, hollow spokes, and perforated rim, provided on its exterior, over the openings, with concave shoes opposite each hollow spoke, in combination with the reciprocating feed-slide, having holes $i\ i$ and V-shaped ends, operated alternately by the drivers attached to the wheel, substantially as described, and for the purpose set forth.

4. The combination of the cylindrical hopper A, axle B, and lever E, substantially as described, and for the purpose set forth.

In testimony that I claim the above I have hereunto subscribed my name in the presence of two witnesses.

THOMSON TERRY.

Witnesses:
 THOMAS OWENS,
 J. B. PRATHER.